United States Patent [19]

Iizuka

[11] Patent Number: 5,079,972

[45] Date of Patent: Jan. 14, 1992

[54] CONTROL SYSTEM FOR AUTOMATIC POWER TRANSMISSION WITH VARIABLE SHIFTING TRANSITION PERIOD

[75] Inventor: Naonori Iizuka, Shizuoka, Japan

[73] Assignee: Jatco Corporation, Shizuoka, Japan

[21] Appl. No.: 576,944

[22] Filed: Sep. 4, 1990

[30] Foreign Application Priority Data

Sep. 5, 1989 [JP] Japan .................................. 1-229523

[51] Int. Cl.⁵ ........................................... B60K 41/06
[52] U.S. Cl. ...................................... 74/866; 74/867; 74/865; 74/861
[58] Field of Search ................. 74/861, 866, 867, 865; 364/424.1

[56] References Cited

U.S. PATENT DOCUMENTS

| | | | |
|---|---|---|---|
| 4,488,456 | 12/1984 | Taga et al. | 74/866 |
| 4,502,354 | 3/1985 | Suzuki et al. | 74/867 X |
| 4,506,563 | 3/1985 | Hiramatsu | 74/867 |
| 4,513,639 | 4/1985 | Hiramatsu | 74/866 |
| 4,519,273 | 5/1985 | Shimizu et al. | 74/867 X |
| 4,563,918 | 1/1986 | Sugano | 74/867 X |
| 4,791,568 | 12/1988 | Hiramatsu et al. | 74/866 X |
| 4,813,307 | 3/1989 | Hiramatsu et al. | 74/861 X |
| 4,967,620 | 11/1990 | Shimanaka | 74/867 X |

Primary Examiner—Leslie A. Braun
Assistant Examiner—Daniel Wittels
Attorney, Agent, or Firm—Ronald P. Kananen

[57] ABSTRACT

A shift control system controls a shifting transition period in order to obtain an optimal shift feeling. The shifting control system sets a shifting transition period which is variable depending upon a vehicular driving condition so that an optimum transmission speed ratio shifting transition in view of a required magnitude of energy absorption can be achieved without causing a substantial shift shock. Preferably, the vehicular driving condition includes vehicle speed which controls which transmission speed ratio is selected for comparison with the current transmission speed ratio to derive a target transition period. The shifting transition period is then adjusted toward the target transition period for smooth shifting.

16 Claims, 3 Drawing Sheets

CONTROL SYSTEM FOR AUTOMATIC POWER TRANSMISSION WITH VARIABLE SHIFTING TRANSITION PERIOD

BACKGROUND OF THE INVENTION

1. Field of the Invention

The present invention relates generally to a control system for an automatic power transmission of an automotive vehicle. More specifically, the invention relates to a shifting transition control in the automatic power transmission for optimization of shifting transition.

2. Description of the Background Art

Japanese Patent First (unexamined) Publication (Tokkai) Showa 57-144338 discloses one example of an automotive automatic power transmission. The shown transmission controls transmission speed ratio by supplying fluid pressure for friction elements depending upon a throttle valve open angle and a vehicle speed. The fluid pressure acting on the friction elements is adjusted depending upon the throttle valve open angle. Therefore, the fluid pressure in the friction element is also controlled depending upon the throttle valve open angle.

Such prior proposed system encounters a drawback in fluctuation of shifting performance, such as magnitude of shift shock and so forth. Furthermore, such prior proposed system may be subject a problem of secular variation of the shifting performance due to tolerance in valve, spring and other transmission components, difference of hydraulic characteristics of fluid circuit, difference of frictional characteristics of friction elements. Thus, an individual transmission may have a unique shifting performance. Furthermore, even when the initial shifting performance is suitably adjusted, the magnitude of shift shock can be increased due to a variation of the frictional characteristics of the friction elements due to wearing or due to fatigue of the working fluid.

In order to solve such drawback in the conventional automatic power transmission, Japanese Patent First (unexamined) Publication (Tokkai) Showa 63-92863 discloses a shift control system, in which a fluid pressure acting on the friction elements is adjusted so as to adjust shifting transition period toward a predetermined period. The shown control system includes an engine load sensor for monitoring an engine load, a vehicle speed sensor for monitoring the vehicle speed, and a shifting commanding means which compares the engine load and the vehicle speed with a preset shifting pattern for detecting the vehicle driving condition requiring shifting of the transmission speed ratio and generating a shifting command. The system also includes a shift actuator which controls supply of fluid pressure for the friction elements depending upon commanded speed ratio, a fluid pressure commanding means responsive to the shifting command for commanding fluid pressure during shifting transition, a fluid pressure adjusting actuator responsive to a fluid pressure command for fluid pressure to be supplied to the friction elements, a shifting transition period measuring means for measuring an elapsed period from occurrence of the shifting command to completion of shifting operation, a shifting period memory for storing a most recent shifting transition period measured by the shifting transition period measuring means, a shifting transition period setting means which stores a set shifting transition period, a comparing means for comparing the shifting transition period stored in the shifting period memory and the set shifting transition period, and a fluid pressure correcting means which adjusts the fluid pressure to be supplied to the friction element so that the difference between the actual shifting transition period stored in the shifting period memory and the set shifting transition period is adjusted. With the shown construction, the shifting transition period can be successfully adjusted toward the set shifting transition period.

However, in such prior proposed automatic transmission control system, a drawback is still encountered. That is, since the prior proposed system adjusts the shifting transition period toward a singular set shifting transition period, the shifting transition period is uniformly controlled to the set period. For this, it should be appreciated that the optimal shifting transition period may be variable depending upon the vehicle driving condition, such as a vehicle speed. Namely, the greater energy absorption will be caused at a higher vehicle speed. That implies that a higher vehicle speed will require a longer shifting transition period for providing a longer period for greater energy absorption. In other words, when the shifting transition period is set for obtaining optimal shifting characteristics at a relatively low speed, the energy absorption rate in a unit time become greater at a relatively high vehicle speed range for causing a stronger shift shock. Furthermore, a high absorption rate of energy may cause a higher rate of wearing in the friction element and thus can shorten the life thereof. Furthermore, in the worse case, the heat generation rate by energy absorption may become excessive relative to the thermal capacities of the friction elements.

SUMMARY OF THE INVENTION

Therefore, it is an object of the present invention to provide a control system for an automatic power transmission which can solve the problems in the prior art set forth above.

In order to accomplish the aforementioned and other objects, a shift control system, according to the present invention, controls a shifting transition period in order to obtain an optimal shift feeling. The shifting control system sets a shifting transition period which is variable depending upon vehicular driving condition so that an optimum transmission speed ratio shifting transition in view of a required magnitude of energy absorption can be done without causing substantial shift shock.

According to one aspect of the invention, a shift control system for an automotive automatic power transmission comprises:

fluid pressure responsive friction means selectively establishing one of a plurality of transmission speed ratios according to a control pressure supplied thereto;

pressure adjusting means associated with the friction means for supplying the control pressure, the pressure adjusting means having a variable pressure level of the control pressure according to a pressure adjusting command;

vehicular driving condition monitoring means for monitoring preselected vehicle driving condition indicative parameters for producing a vehicular driving condition indicative signal; and control means for processing the vehicular driving condition indicative signal for selecting one of plurality of transmission gear ratios adapted to the instantaneous vehicle driving condition, the control means supplying a shifting command for the friction means for establishing the selected speed ratio and supplying the pressure adjusting command to the pressure adjusting means for adjusting a shifting transition period to a target transition period, the control means varying the target transition period depending upon the vehicle driving condition.

The control means may include a memory means for storing an actual transition period at the immediately preceding occurrence of the speed ratio shifting operation for deriving the pressure adjusting command to reduce a difference between the stored actual transition period and the target transition period. In such case, the control means modifies the pressure adjusting command by a predetermined value at each control cycle until the difference becomes smaller than a predetermined criterion.

On the other hand, the control means may derive the target shifting transition period based on a magnitude of energy absorption required upon shifting of speed ratio so that a longer target shifting transition period is provided for greater energy absorption. In the practical embodiment, the vehicular driving condition monitoring means monitors vehicular driving condition indicative parameters including at least a vehicular speed, and the control means takes the vehicular speed as a parameter representative of a required magnitude of energy absorption. In such case, the target shifting transition period is continuously varied according to variation of the vehicle speed so that the target shifting transition period is continuously increased according to increasing vehicle speed.

Furthermore, the vehicular driving condition monitoring means may monitor preselected vehicular driving condition indicative parameters including an engine load, and the control means derives a basic pressure adjusting command value on the basis of the engine load and modifies the back pressure adjusting command with a correction coefficient derived for reducing the difference toward zero.

According to another aspect of the invention, a shift control system for an automative automatic power transmission comprises:

fluid pressure responsive friction means selectively establishing one of a plurality of transmission speed ratios according to a control pressure supplied thereto;

pressure adjusting means associated with the friction means for supplying the control pressure, the pressure adjusting means having a variable pressure level of the control pressure according to a pressure adjusting command;

an engine load sensor for monitoring a load condition on an automotive internal combustion engine for producing an engine load indicative signal;

a vehicle speed sensor for monitoring vehicular traveling speed for producing a vehicle speed indicative signal; and control means for selecting one of a plurality of transmission gear ratios adapted to the instantaneous vehicle driving condition according to a preset shift pattern on the basis of the engine load indicative signal and the vehicle speed indicative signal, the control means supplying a shifting command for the friction means for establishing the selected speed ratio and supplying the pressure adjusting command to the pressure adjusting means for adjusting a shifting transition period to a target transition period which is variable depending upon the vehicular speed indicative signal value.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

DESCRIPTION OF THE PREFERRED EMBODIMENT

Figure 1:
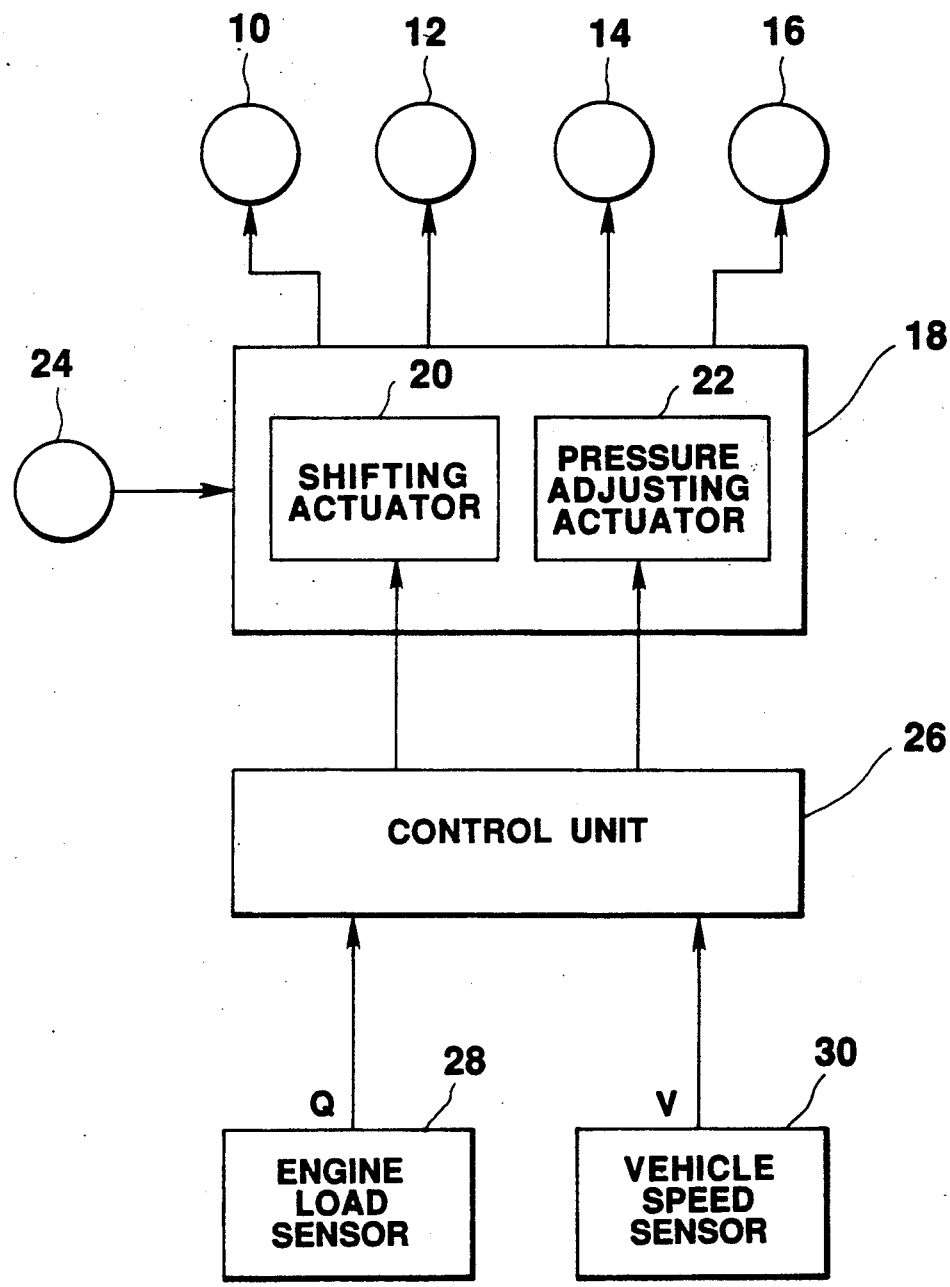
FIG. 1 is a schematic block diagram of the preferred embodiment of a control system for an automatic power transmission according to the present invention.

Referring now to the drawings, particularly to FIG. 1, the shown embodiment of a control system for an automotive automatic power transmission, according to the present invention, is adapted to perform shift control for an automatic power transmission which has two multi-plate clutchs, single band brake and single multi-plate brake for establishing three forward speed ratios. Such type of the automatic power transmission has been disclosed in Japanese Patent First (unexamined) Publication 60-1444 for example. However, the present invention is not specifically adapted for the automatic power transmission establishing the three forward speed ratios, but is also applicable for the transmissions establishing four or more forward speed ratios.

Multi-plate clutches 10 and 12, a band brake 14 and a multi-plate brake 16 form friction elements of the automatic power transmission. These friction elements are connected to a control valve unit 18. The control valve unit 18 includes a shift actuator 20 and a fluid pressure adjusting actuator 22. The shift actuator 20 controls the pressure supply for the friction elements. On the other hand, the fluid pressure adjusting actuator 22 adjusts the fluid pressure to be supplied to the friction elements. For this, the control valve unit 18 is connected to an oil pump 24 to receive therefrom a discharge pressure as a source pressure. The control valve unit 18 is generally operable for adjusting the fluid pressure from the oil pump 24 and controls distribution of the fluid pressure for respective friction elements. Though it is not clearly shown, the shift actuator 20 comprises a plurality of solenoids and shift valves. Respective shift valves are operated by the associated solenoids for adjustment of the pressure supply for respective friction elements. On the other hand, the fluid pressure adjusting actuator 22 comprises a duty controlled solenoid and a regulator valve. The duty controlled solenoid opens and closes a flow restriction orifice according to the duty cycle of a control signal applied thereto for adjusting magnitude of pilot pressure. The pilot pressure thus modulated is supplied to the regulator valve for obtaining a desired fluid pressure.

In order to control operation of the shift actuator 20 and the fluid pressure adjusting actuator 22, a control unit 26 is provided. The control unit 26 comprises a microprocessor and processes preselected transmission control parameters for generating control signals to be supplied to the shift actuator 20 and the fluid pressure adjusting actuator 22. In the shown embodiment, an engine load sensor 28 and a vehicle speed sensor 30 are employed for providing the control parameters for the control unit 26. The engine load sensor 28 may comprise a throttle angle sensor for monitoring a throttle valve open angle to produce an engine load indicative signal Q representative of the throttle valve open angle. On the other hand, the vehicle speed sensor 30 monitors the vehicle speed to produce a vehicle speed indicative signal V.

Though the shown embodiment employs the throttle angle sensor as the engine load sensor 28, it may be replaced with an intake airflow meter, an intake air pressure sensor and so forth. Furthermore, in case that the vehicle employs an electric accelerator control system for adjusting the throttle valve angular position with a throttle servo mechanism operable by an electric signal representative of an accelerator pedal depression magnitude, the control command for the throttle servo system may also be used for providing the engine load representative parameter.

Figure 2:
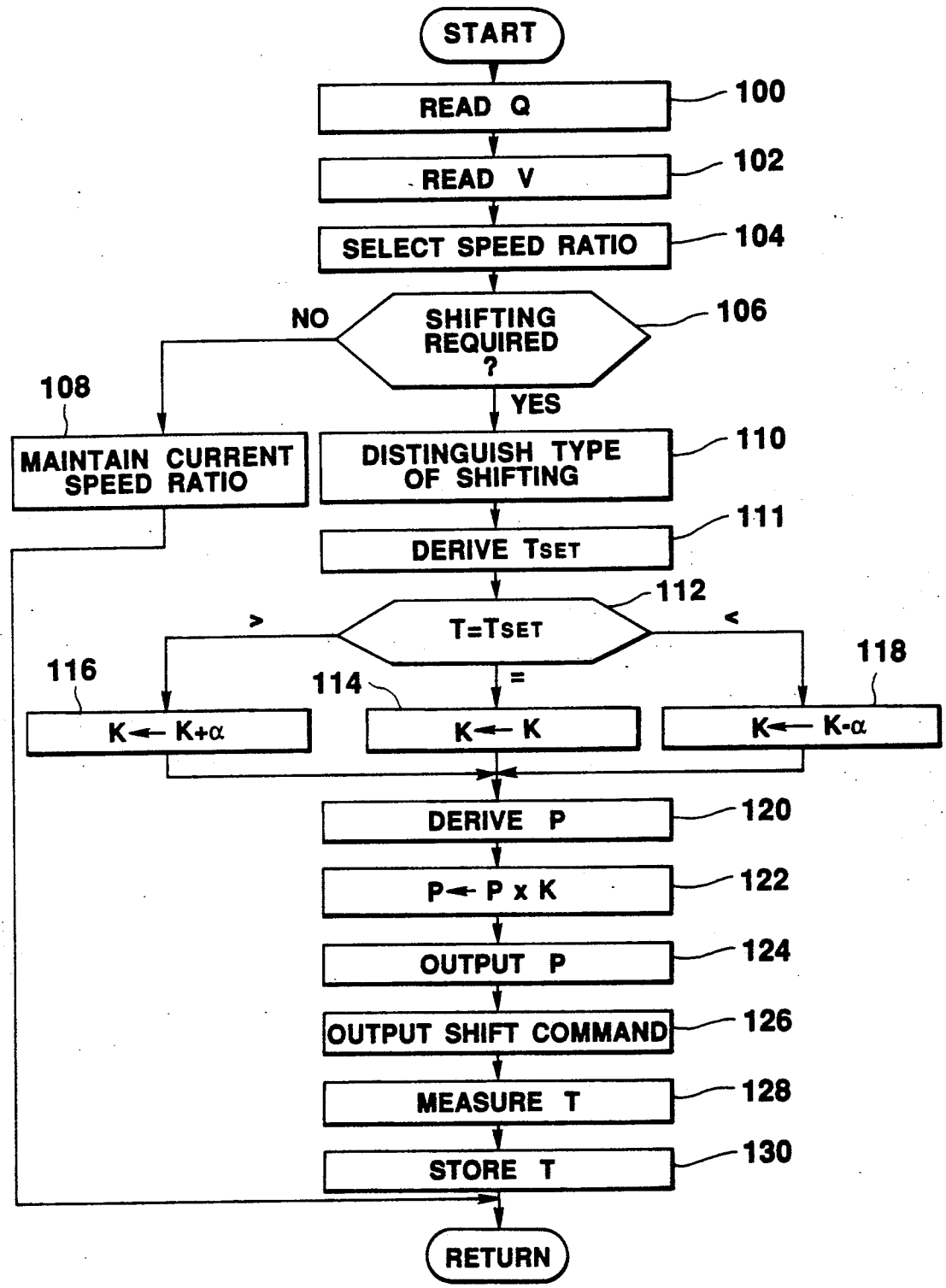
FIG. 2 is a flowchart showing a shift control routine to be executed in the shown embodiment of the control system of the invention.

In the practical shift control operation, the control unit 26 periodically executes a control routine which is programmed as one of a plurality of vehicular control programs governed by a main routine which is executed as a background job. Principally, the control routine as shown in FIG. 2 is executed at every given timing, e.g. every 20 msec., to perform a transmission shift control operation. In the shown routine, an engine load indicative signal Q is read out at a step 100, immediately after starting execution. Then, at a step 102, the vehicle speed indicative signal V is read out. The combination of the engine load indicative signal Q and the vehicle speed indicative signal V are compared with a preset shift pattern for selecting an optimum transmission speed ratio in view of the instantaneous vehicle driving condition represented by the vehicle speed indicative signal V and the engine load indicative signal Q, at a step 104. Then, the transmission speed ratio derived at the step 104 is compared with a current speed ratio for checking whether a shifting operation is required or not, at a step 106. When the current transmission speed ratio coincides with the selected speed ratio, a holding of a current shift position is commended at a step 108 and the process returns to a main routine.

Figure 3:
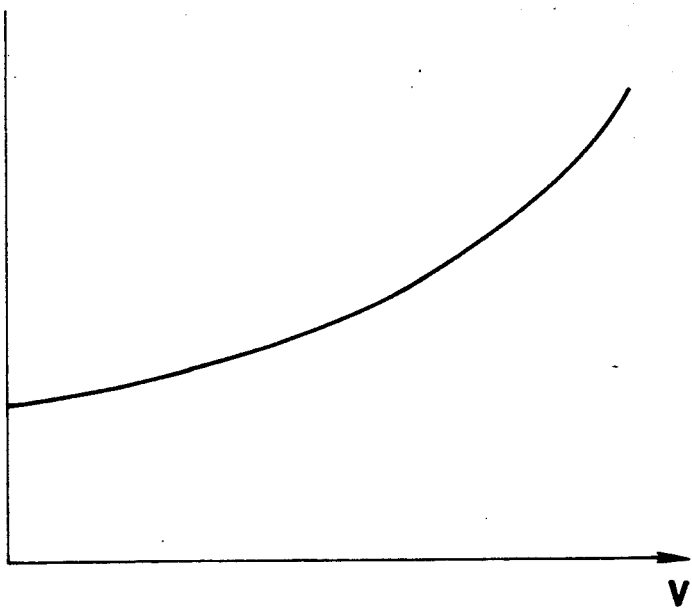
FIG. 3 is a chart showing relationship between a set shifting transition period and a vehicle speed.

On the other hand, when the selected speed ratio is different from the current speed ratio, a judgement can be made that a speed ratio shifting operation is required, at the step 106. Then, at a step 110, a type of required speed ratio shifting is checked. In the shown embodiment, a check is performed whether the required shift operation is 1-2 shifting for shifting up a speed ratio from a first (1) range to a second (2) range, 2-3 shifting for shifting a speed ratio from a second range to a third (3) range, or 3-2 shifting for shifting from the third range to the second range, for example. Thereafter, a target shifting transmission period $T_{set}$ is derived at a step 111. In the shown embodiment, the target shifting transition period is variable depending upon the vehicle speed, as shown in FIG. 3. Namely, as can be seen from FIG. 3, the target shifting transition period $T_{set}$ is an increased according to increasing of the vehicular speed V. The variation characteristics of the target shifting transmission period $T_{set}$ may not be specified to the shown pattern but appropriately set through experiments in view of the relationship between the speed ratios between which a shifting operation is performed or any additional factors. Therefore, it should be noted that the only important feature is to vary the target shifting transition period depending upon the vehicle speed. More to say, it may be said as an important feature to increase the target shifting transmission period $T_{set}$ according to increasing of the vehicle speed V.

At the step 111, the target shifting transition period thus derived is set in an appropriate address in a memory. Thereafter, the target shifting transition period $T_{set}$ and an actual shifting transition period T which is measured in the immediately preceding occurrence of speed ratio shifting, are read out and compared, at a step 112. In practice, the process at the step 112 is performed by comparing the actual shifting transition period T with upper and lower limit values defining an acceptable transition period range about the target transition period $T_{set}$. When the actual shifting transition period T is within the acceptable transition period range as checked at the step 112, then a pressure correction command value K is maintained at the previously set value at a step 114. On the other hand, when the actual shifting transition period T is longer than the acceptable transition period range and thus the actual shifting transition period indicative value T is greater than the upper limit value, the pressure correction command value K is modified by adding a predetermined value α, at a step 116. On the other hand, when the actual shifting transition period T is shorter than the acceptable transition period range and thus the actual transition period indicative value T is smaller than the lower limit value as checked at the step 112, then the pressure correction command value K is modified by subtracting the predetermined value α, at a step 118.

At a step 120, a basic pressure indicative duty cycle value P is derived which represents the basic value of the duty cycle of the control signal to be applied to the fluid pressure adjusting actuator 22. In practice, the basic pressure indicative duty cycle value P is derived on the basis of the engine load indicative signal value Q. Then, the basic pressure indicative duty cycle value P is modified by multiplying P with the pressure correction command value K which is derived at one of the steps 114, 116 and 118, at a step 122. Thereafter, the control signal having a duty cycle corresponding to the modified pressure indicative duty cycle value P is output to the fluid pressure adjusting actuator 22 for adjusting the pilot pressure for controlling the modulator valve, at a step 124. Subsequently, at a step 126, a shifting command is supplied to the shift actuator 20 for initiating the shifting operation. Then, a timer is started for monitoring the shifting transition period in the current shifting cycle. When a shifting operation is completed, the measured elapsed time is latched as the actual shifting transition period indicative value T, at a step 128. Then, the latched actual shifting transition period indicative value T is stored in the memory of the control unit 26, at a step 130. After the process at the step 130 process returns to the main routine.

As can be appreciated herefrom, according to the shown embodiment, since the shifting transition period for shifting a transmission speed ratio is varied according to a variation of the vehicular speed, an optimal shift feeling can be obtained while eliminating substantial shift shock and possibility of substantial wearing of the friction elements. Furthermore, in the shown embodiment, since the actual shifting transition period is updated at every occurence of shifting of the speed ratio for adapting the operation of the fluid pressure adjusting actuator for the actual shifting transition period, influence of tolerance of the transmission components, hydraulic circuit and so forth, secular variation of the components' performance, variation of engine performance, vehicular mass weight and so forth can be successfully avoided.

While the present invention has been discussed in terms of the preferred embodiment of the invention, the invention should not be understood to be limited to the shown embodiment but can be embodied in various fashions. Therefore, the invention should be understood to include all possible embodiments and modifications which can be implemented without departing from the principle of the invention, which is set out in the appended claims.

For example, though the shown embodiment has been discussed for the automatic power transmission having a singular shifting pattern, the idea of the invention is applicable for the automatic power transmission having a plurality of shift patterns. In such case, the shifting transition period may be set for longer period for higher speed type shift pattern.

What is claimed is:

1. A shift control system for an automotive automatic power transmission comprising:
    fluid pressure responsive friction means selectively establishing one of a plurality of transmission speed ratios according to a control pressure supplied thereto;
    pressure adjusting means associated with said friction means for supplying said control pressure, said pressure adjusting means having a variable pressure level of said control pressure according to a pressure adjusting command;
    vehicular driving condition monitoring means for monitoring preselected vehicle driving condition indicative parameters for producing a vehicular driving condition indicative signal; and
    control means for processing said vehicular driving condition indicative signal for selecting one of transmission gear ratios adapted to the instantaneous vehicle driving condition, said control means supplying a shifting command for said friction means for establishing the selected speed ratio and supplying said pressure adjusting command to said pressure adjusting means for adjusting a shifting transition period to a target transition period, said control means varying said target transition period depending upon the vehicle driving condition.

2. A shift control system as set forth in claim 1, wherein said control means includes a memory means for storing an actual transition period at the immediately preceding occurrence of a speed ratio shifting operation for deriving said pressure adjusting command to reduce a difference between the stored actual transition period and said target transition period.

3. A shift control system as set forth in claim 2, wherein said control means modifies said pressure adjusting command by a predetermined value at each control cycle until said difference becomes smaller than a predetermined criterion.

4. A shift control system as set forth in claim 1, wherein said control means derives said target shifting transition period based on a magnitude of energy absorption required upon a shifting of speed ratio so that a longer target shifting transition period is provided for a greater energy absorption.

5. A shift control system as set forth in claim 4, wherein said vehicular driving condition monitoring means monitors vehicular driving condition indicative parameters including at least a vehicular speed, and said control means takes said vehicular speed as a parameter representative of required magnitude of energy absorption.

6. A shift control system as set forth in claim 5, wherein said target shifting transition period is continuously varied according to a variation of the vehicle speed so that the target shifting transition period is continuously an increased according to increasing of the vehicle speed.

7. A shift control system as set forth in claim 3, wherein said vehicular driving condition monitoring means monitors preselected vehicular driving condition indicative parameters including an engine load, and said control means derives a basic pressure adjusting command value on the basis of said engine load and modifies said back pressure adjusting command with a correction coefficient derived for reducing said difference toward zero.

8. A shift control system for an automotive automatic power transmission comprising:
    fluid pressure responsive friction means selectively establishing one of a plurality of transmission speed ratios according to a control pressure supplied thereto;
    pressure adjusting means associated with said friction means for supplying said control pressure, said pressure adjusting means having a variable of pressure level of said control pressure according to a pressure adjusting command;
    an engine load sensor for monitoring a load condition on an automotive internal combustion engine for producing an engine load indicative signal;
    a vehicle speed sensor for monitoring vehicular traveling speed for producing a vehicle speed indicative signal; and
    control means for selecting one of a plurality of transmission gear ratios adapted to the instantaneous vehicle driving condition according to a preset shift pattern on the basis of said engine load indicative signal and said vehicle speed indicative signal, said control means supplying a shifting command for said friction means for establishing the selected speed ratio and supplying said pressure adjusting command to said pressure adjusting means for adjusting a shifting transition period to a target transition period which is variable depending upon the vehicular speed indicative signal value.

9. A shift control system as set forth in claim 8, wherein said control means includes a memory means for storing an actual transition period at the immediately preceding occurrence of a speed ratio shifting operation for deriving said pressure adjusting command to reduce a difference between the stored actual transition period and said target transition period.

10. A shift control system as set forth in claim 9, wherein said control means modifies said pressure adjusting command by a predetermined value at each control cycle until said difference becomes smaller than a predetermined criterion.

11. A shift control system as set forth in claim 10, wherein said target shifting transition period is continuously varied according to a variation of the vehicle speed so that the target shifting transition period is continuously increased according to an increasing of the vehicle speed.

12. A shift control system as set forth in claim 11, wherein said vehicular driving condition monitoring means monitors preselected vehicular driving condition indicative parameters including an engine load, and said control means derives a basic pressure adjusting command value on the basis of said engine load and modifies said back pressure adjusting command with a correction coefficient derived for reducing said difference toward zero.

13. In an automatic power transmission for an automotive vehicle including a fluid pressure responsive friction means including a plurality of friction elements for selectively engaging and releasing for selecting one of a plurality of transmission speed ratios, said friction means being responsive to a hydraulic control pressure for switching states of said friction elements for establishing a commanded transmission speed ratio, and a pressure adjusting means associated with said friction means for supplying said control pressure, said pressure adjusting means having a variable pressure level of said control pressure which varies according to a pressure adjusting command,
    wherein a method for controlling a shifting operation in said automatic power transmission comprises the steps of:
    monitoring a vehicle driving condition in terms of preselected transmission control parameters which include a vehicle speed, for providing control parameter signals including a vehicle speed indicative signal;
    selecting one of a plurality of transmission speed ratios on the basis of said control parameter signals according to a predetermined shift pattern;
    detecting the selected transmission speed ratio differentiated from the current transmission speed ratio for generating a shifting command for establishing associated states of said friction elements of said friction means and thereby establishing a selected transmission speed ratio;
    deriving a target transition period at least on the basis of a vehicle speed; and
    producing a pressure adjusting command for controlling operation of said pressure adjusting means so as to adjust the shifting transition period toward said target transition period.

14. In an automatic power transmission for an automotive vehicle including a fluid pressure responsive friction means including a plurality of friction elements for selectively engaging and releasing for selecting one of a plurality of transmission speed ratios, said friction means being responsive to a hydraulic control pressure for switching states of said friction elements for establishing a commanded transmission speed ratio, and a pressure adjusting means associated with said friction means for supplying said control pressure, said pressure adjusting means having a variable pressure level of said control pressure which varies according to a pressure adjusting command,
    wherein a method for controlling a shifting operation in said automatic power transmission comprises the steps of:
    monitoring a vehicle driving condition in terms of preselected transmission control parameters which include a vehicle speed, for providing control parameter signals including a vehicle speed indicative signal;
    selecting one of a plurality of transmission speed ratios on the basis of said control parameter signals according to a predetermined shift pattern;
    detecting the selected transmission speed ratio differentiated from the current transmission speed ratio for generating a shifting command for establishing associated states of said friction elements of said friction means and thereby establishing a selected transmission speed ratio;
    deriving a target transition period on the basis of a vehicle speed and a type of demanded shift operation determined by the current transmission speed ratio and said selected transmission speed ratio; and
    producing a pressure adjusting command for controlling operation of said pressure adjusting means so as to adjust the shifting transition period toward said target transition period.

15. In an automatic power transmission for an automotive vehicle including a fluid pressure responsive friction means including a plurality of friction elements for selectively engaging and releasing for selecting one of a plurality of transmission speed ratios, said friction means being responsive to a hydraulic control pressure for switching states of said friction elements for establishing a commanded transmission speed ratio, and a pressure adjusting means associated with said friction means for supplying said control pressure, said pressure adjusting means having a variable pressure level of said control pressure which varies according to a pressure adjusting command,
    wherein a method for controlling a shifting operation in said automatic power transmission comprises the steps of:
    monitoring a vehicle driving condition in terms of preselected transmission control parameters which include a vehicle speed, for providing control parameter signals including a vehicle speed indicative signal;
    selecting one of a plurality of transmission speed ratios on the basis of said control parameter signals according to a predetermined shift pattern;
    detecting the selected transmission speed ratio differentiated from the current transmission speed ratio for generating a shifting command for establishing associated states of said friction elements of said friction means and thereby establishing a selected transmission speed ratio;
    deriving a target transition period on the basis of a vehicle speed and a type of demanded shift operation determined by the current transmission speed ratio and said selected transmission speed ratio, and further based on the selected one of the shift patterns selected in derivation of said selected transmission speed ratio; and
    producing a pressure adjusting command for controlling operation of said pressure adjusting means so as to adjust the shifting transition period toward said target transition period.

16. In an automatic power transmission for an automotive vehicle including a fluid pressure responsive friction means including a plurality of friction elements for selectively engaging and releasing for selecting one of a plurality of transmission speed ratios, said friction means being responsive to a hydraulic control pressure for switching states of said friction elements for establishing a commanded transmission speed ratio, and a pressure adjusting means associated with said friction means for supplying said control pressure, said pressure adjusting means having a variable pressure level of said control pressure which varies according to a pressure adjusting command, wherein a method for controlling a shifting operation in said automatic power transmission comprises the steps of:

monitoring a vehicle driving condition in terms of preselected transmission control parameters which include a vehicle speed, for providing control parameter signals including a vehicle speed indicative signal;

selecting one of a plurality of transmission speed ratios on the basis of said control parameter signals according to a predetermined shift pattern;

detecting the selected transmission speed ratio differentiated from the current transmission speed ratio for generating a shifting command for establishing associated states of said friction elements of said friction means and thereby establishing a selected transmission speed ratio;

deriving a target transition period as a function of the vehicle speed; and producing a pressure adjusting command for controlling operation of said pressure adjusting means so as to adjust the shifting transition period toward said target transition period.

* * * * *